(12) United States Patent
Poncelet et al.

(10) Patent No.: US 7,507,392 B2
(45) Date of Patent: *Mar. 24, 2009

(54) METHOD FOR PREPARING A HYBRID ALUMINOSILICATE POLYMER AND THE POLYMER RESULTING FROM THIS METHOD

(75) Inventors: Olivier J. Poncelet, Chalon sur Saone (FR); Stephanie V. Desrousseaux, Ouroux sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 10/521,899

(22) PCT Filed: Jul. 14, 2003

(86) PCT No.: PCT/EP03/07578

§ 371 (c)(1),
(2), (4) Date: Jan. 14, 2005

(87) PCT Pub. No.: WO2004/016058

PCT Pub. Date: Feb. 19, 2004

(65) Prior Publication Data

US 2005/0238559 A1    Oct. 27, 2005

(30) Foreign Application Priority Data

Jul. 18, 2002    (FR) .................................. 02 09086

(51) Int. Cl.
*C01B 33/36* (2006.01)
*C01B 39/00* (2006.01)
*C01F 7/00* (2006.01)

(52) U.S. Cl. ...................................... 423/700; 423/710

(58) Field of Classification Search .......... 423/700–718
See application file for complete search history.

(56) References Cited

U.S. PATENT DOCUMENTS

| 6,468,492 B2 * | 10/2002 | Poncelet ................... 423/328.1 |
| 2003/0095908 A1 * | 5/2003 | Pinnavaia et al. ........... 423/335 |
| 2005/0253916 A1 * | 11/2005 | Poncelet et al. ............. 347/105 |
| 2006/0045833 A1 * | 3/2006 | Poncelet et al. .......... 423/328.1 |

FOREIGN PATENT DOCUMENTS

| EP | 0895965 | 2/1999 |
| EP | 1112959 | 7/2001 |
| WO | WO 9613459 | 5/1996 |

OTHER PUBLICATIONS

Guilment, Jean et al; "Hybrid organic-inorganic materials designed to clean wash water in photographic processing: Genesis of a sol-gel industrial product—The Kodak Water Saving Treatment System"; Organic/Inorganic Hybrid Materials 2002-; San Francisco, CA. United States Apr. 1-5, 2002; vol. 726, 2002; pp. 217-222; XO008016392 Mater Res Soc Symp Proc; Materials Research Society Symposium—Proceedings 2002.

* cited by examiner

*Primary Examiner*—Jerry Lorengo
*Assistant Examiner*—Matthew E Hoban
(74) *Attorney, Agent, or Firm*—J. Jeffrey Hawley; Arthur E. Kluegel (57) ABSTRACT

The present invention relates to a method for preparing a hybrid aluminosilicate polymer and the polymer resulting from this method. Said method consists in treating an aluminum halide with a mixture of at least one silicon alkoxide only having hydrolyzable substituents and at least one silicon alkoxide having a non-hydrolyzable substituent, with an aqueous alkali, in the presence of silanol groups, aluminum concentration being maintained at less than 0.3 mol/l, the Al/Si molar ratio being maintained between 1 and 3.6 and the alkali/Al molar ratio being maintained between 2.3 and 3; and then in stirring the resulting mixture at ambient temperature in the presence of silanol groups for long enough to form the hybrid aluminosilicate polymer.

24 Claims, 11 Drawing Sheets

METHOD FOR PREPARING A HYBRID ALUMINOSILICATE POLYMER AND THE POLYMER RESULTING FROM THIS METHOD

FIELD OF THE INVENTION

The present invention relates to a method for preparing a hybrid aluminosilicate polymer and the polymer resulting from this method.

DESCRIPTION RELATIVE TO THE PRIOR ART

Inorganic aluminosilicate polymers are already known in various forms. For example aluminosilicate polymers are known in fiber form, such as imogolite. Imogolite is a filamentary, tubular and crystallized aluminosilicate, present in the impure natural state in volcanic ashes and certin soils; it was described for the first time by Wada in J. Soil Sci. 1979, 30(2), 347-355. Imogolite can be synthesized with various degrees of purity using different methods. A method for obtaining an imogolite gel with a high degree of purity is described in Patent Application EP-A-1,112,959. This method consists in treating a mixed alkoxide of aluminum and silicon with an aqueous alkali with pH between 4 and 6.5, by maintaining the aluminum molar concentration between $5.10^{-4}$ and $10^{-2}$ M and the Al/Si molar ratio between 1 and 3, then heating the mixture obtained in the presence of silanol groups for long enough to form the fibrous aluminosilicate polymer and eliminate the residual ions from the reaction medium.

Inorganic aluminosilicate polymers are also known in spherical particle form. U.S. Pat. No. 6,254,845 describes a method for preparing hollow spheres of amorphous aluminosilicate polymers. This method consists in mixing at high speed a silicon-based compound (0.01-1 mol/l) with an aluminum compound (0.01-1 mol/l) to form a suspension having precursor particles and a salt in solution (byproduct), eliminating a portion of said salt in solution and subjecting the precursor particles to heat treatment so as to obtain a porous material in the form of aluminosilicate hollow spheres. This porous material can be used in deodorants, humidity absorbers or in microencapsulated medicines.

SUMMARY OF THE INVENTION

The present invention provides for a new method for preparing a hybrid aluminosilicate polymer and a new hybrid aluminosilicate polymer obtainable by this method. The introduction of functions, in particular organic functions into the inorganic alumninosilicate polymer enables a hybrid aluminosilicate polymer to be obtained with new properties compared with known inorganic aluminosilicate polymers.

The method of the present invention for preparing a hybrid aluminosilicate polymer, comprises the following steps:

a) treating a mixed aluminum and silicon alkoxide of which the silicon has both hydrolyzable substituents and a non-hydrolyzable substituent, or a mixed aluminum and silicon precursor resulting from the hydrolysis of a mixture of aluminum compounds and silicon compounds only having hydrolyzable substituents and silicon compounds having a non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the hybrid aluminosilicate polymer; and c) eliinating the byproducts formed during steps a) and b) from the reaction medium.

Throughout the present description, the expression "non-hydrolyzable substituent" means a substituent that does not separate from the silicon atom during the process and in particular at the time of treatment with the aqueous alkali. Such substituents are for example hydrogen, fluoride or an organic group. On the contrary the expression "hydrolyzable substituent" means a substituent eliminated by hydrolysis in the same conditions.

In the following, the expression "modified mixed aluminum and silicon alkoxide" means a mixed aluminum and silicon alkoxide in which the aluminum atom only has hydrolyzable substituents and the silicon atom has both hydrolyzable substituents and a non-hydrolyzable substituent.

Similarly, the expression "modified mixed aluminum and silicon precursor" means a precursor obtained by hydrolysis of a mixture of aluminum compounds and silicon compounds only having hydrolyzable substituents and silicon compounds having a non-hydrolyzable substituent. This is the non-hydrolyzable substituent that will be found again in the hybrid aluminosilicate polymer material of the present invention.

More generally, an "unmodified" compound is a compound that only consists of hydrolyzable substituents and a "modified" compound is a compound that consists of a non-hydrolyzable substituent.

Step c) can be carried out according to different well-known methods, such as washing or diafiltration.

The present invention also relates to the hybrid aluminosilicate polymer material obtainable by the method defined above. This new polymer has an amorphous structure shown by electron diffraction. This material is characterized in that its Raman spectrum comprises in spectral region 200-600 $cm^{-1}$ a wide band at $250 \pm 6$ $cm^{-1}$, a wide intense band at $359 \pm 6$ $cm^{-1}$, a shoulder at $407 \pm 7$ $cm^{-1}$, and a wide band at $501 \pm 6$ $cm^{-1}$, as well as bands corresponding to the silicon non-hydrolyzable substituent (bands linked to the non-hydrolyzable substituent can be juxtaposed with other bands), the Raman spectrum being produced for the material resulting from step b) and before step c).

DETAILED DESCRIPTION OF THE INVENTION

According to one embodiment of the method according to the present invention, the modified mixed aluminum and silicon precursor is formed in situ by mixing in aqueous medium (i) one compound selected from the group consisting of aluminum salts, aluminum alkoxides and aluminum halogenoalkoxides and (ii) at least one compound selected from the group consisting of unmodified silicon alkoxides and chloroalkoxides, and (iii) at least one compound selected from the group consisting of modified silicon alkoxides and chloroalkoxides.

The modified or unmodified alkoxide radical of the aluminum compound or silicon compound preferably contains 1 to 5 carbon atoms, such as methoxide, ethoxide, n-propoxide, or i-propoxide.

Preferably, an aluminum salt is used, such as a halide (e.g. chloride or bromide), a perhalogenate, a sulfate, a nitrate, a phosphate or a carboxylate. An aluminum halide, such as chloride, is particularly preferred.

Preferably, silicon compounds are used in the form of alkoxides.

A single unmodified silicon alkoxide or a mixture of unmodified silicon alkoxides, or a single unmodified silicon chloroalkoxide or a mixture of unmodified silicon chloroalkoxides, or a mixture of unmodified silicon alkoxides and chloroalkoxides can be used. Similarly, a single modified silicon alkoxide or a mixture of modified silicon alkoxides, or a single modified silicon chloroalkoxide or a mixture of modified silicon chloroalkoxides, or a mixture of modified silicon alkoxides and chloroalkoxides can be used.

Preferably, a mixture (i) of an aluminum halide and (ii) a mixture with at least one unmodified silicon alkoxide and at least one modified silicon alkoxide is produced.

An unmodified silicon alkoxide can be represented by the formula $Si-(OR)_4$, and a modified silicon alkoxide can be represented by the formula $R'-Si-(OR)_3$, where R represents an alkyl group comprising 1 to 5 carbon atoms R' represents H, F, or a substituted or unsubstituted linear or ramified alkyl or alkenyl group, comprising 1 to 8 carbon atoms, e.g. a methyl, ethyl, n-propyl, n-butyl, 3-chloropropyl group, or a vinyl group.

Preferably, the unmodified silicon alkoxide is tetramethyl or tetraethyl orthosilicate, and the modified silicon alkoxide is methyltriethoxysilane or vinyltriethoxysilane.

The ratio of unmodified silicon alkoxide to modified silicon alkoxide is between 0.1 and 10 in moles of silicon, and is preferably about 1.

In practice, the unmodified silicon alkoxide/modified silicon alkoxide mixture is first produced pure or diluted in a co-solvent such as an alcohol. Said alcohol is preferably ethanol, used in sufficient amount to obtain a clear homogeneous mixture once the silicon compounds are mixed with the aluminum compound. Then, this mixture is added to the aluminum salt in aqueous solution, with stirring, at ambient temperature between 15° C. and 35° C., preferably between 20° C. and 25° C., until a clear homogeneous mixture is obtained. A modified mixed aluminum and silicon precursor is thus obtained. The stirring time varies from 10 to 240 minutes, and is preferably 120 minutes.

According to step a) of the method according to the invention, the precursor or a modified mixed aluminum and silicon alkoxide is then put in contact with an aqueous alkali, the aluminum concentration being maintained at less than 0.3 mol/l, the Al/Si molar ratio being maintained between 1 and 3.6, and the alkali/Al molar ratio being maintained between 2.3 and 3. Advantageously, the aluminum concentration is between $1.4 \times 10^{-2}$ and 0.3 mol/l and even more preferably between $4.3 \times 10^{-2}$ and 0.3 mol/l. Preferably, the Al/Si molar ratio is between 1 and 2.

Preferably, an aqueous solution of sodium, potassium or lithium hydroxide, diethylamine or triethylamine with concentration between 0.5 M and 3 M, and preferably 3 M is used. The alkali can also be in the form of an hydroalcoholic solution.

The alkali is added to the precursor or to the modified mixed aluminum and silicon alkoxide at a rate preferably between 50 and 650 mmoles/hour.

According to the invention, the addition of the alkali in step a) is performed in the presence of silanol groups. These groups can be supplied by glass or silica (glass wool) particles or beads, which have superficial hydroxy groups. When the volume of liquid to be treated is large, it may be desirable to increase the quantity of beads. The diameter of the beads can be between 0.2 and 5 mm and preferably between 1 and 3 mm. To simplify the implementation of the method according to the invention, the preparation of the mixed aluminum and silicon precursor can also be performed in the presence of silanol groups, for example by circulating the mixture in a bed of glass beads.

After the addition of the alkali, step b) of the method according to the invention consists in stirring the mixture resulting from step a) at ambient temperature in the presence of silanol groups long enough to form the hybrid aluminosilicate polymer.

Then, step c) of the method according to the invention consists in eliminating from the reaction medium the byproducts formed during steps a) and b), such as the residual ions resulting essentially from the alkali used in step a). The residual ions can be eliminated by washing, by successive sedimentation or by diafiltration. The hybrid aluminosilicate polymer material according to the invention resulting from step c) can then be concentrated by centrifugation or nanofiltration. The introduction of non-hydrolyzable substituents, such as organic functions, enables providing for example an organophilic character to the hybrid aluminosilicate polymers according to the present invention.

In a first embodiment of the method according to the invention, during step a) a quantity of alkali is added in order to obtain an alkali/Al molar ratio of about 2.3. In this case the pH is maintained between 4 and 5, and preferably between 4.2 and 4.3. Then step b) as described above is applied. The aluminosilicate polymer material according to the present invention is thus obtained in dispersion form. Step c) to eliminate the residual ions can then be performed by diafiltration, followed by nanofiltration concentration.

In a second embodiment of the method according to the invention, during step a) a quantity of alkali is added to obtain an alkali/Al molar ratio of about 3. Then step b) as described above is applied. The aluminosilicate polymer material according to the present invention is thus obtained in suspension form. Step c) to eliminate the residual ions can then be performed by diafiltration, followed by nanofiltration concentration, the aluminosilicate polymer material having been previously redispersed by adding acid, such as hydrochloric or acetic acid or a mixture thereof.

In a third embodiment, the method according to the invention comprises an additional step d), after step b) and before step c). Said step d) consists in adding in a few minutes an additional quantity of aqueous alkali to reach an alkali/Al molar ratio of 3 if this ratio had not already been reached during step a). The aluminosilicate polymer material according to the present invention is thus obtained in suspension form. Step c) to eliminate the residual ions can then be performed by diafiltration, followed by nanofiltration concentration, the aluminosilicate polymer material having been previously redispersed by adding hydrochloric acid. Step c) can also be performed by washing with osmosed water by successive sedimentations, followed by centrifugation concentration.

The hybrid aluminosilicate polymer material according to the present invention resulting from step c) followed by concentration has physical gel form. The Al/Si molar ratio is between 1 and 3.6. Subsequent lyophilization enables the hybrid aluminosilicate polymer according to the invention to be obtained in solid form.

In another embodiment, the method according to the invention comprises a additional step e), after step c), by which at least one chelating agent of aluminum is added to the hybrid aluminosilicate polymer resulting from step c). Then the mixture is stirred. Subsequent evacuation by vacuum enables the hybrid aluminosilicate polymer according to the invention to be obtained in solid form.

Said chelating agent of aluminum can be selected from the group consisting of carboxylic acids, phosphonic acids, sulfonic acids, difunctional acids, their ester and anhydride components, and amino acids. Preferably, the chelating agent of aluminum is selected from the group consisting of HCOOH, $R_1COOH$ wherein $R_1$ is selected from the group consisting of $CH_3(CH_2)_n$, n being between to 0 and 12, $CF_3$, $C_6H_5$, $(C_6H_5)_2$, substituted aromatic rings as in salicylic acid, $C_4H_4S$; $R_2PO(OH)_2$ wherein $R_2$ is selected from the group consisting of $CH_3$, $C_6H_5$; $R_3SO_3H$ wherein $R_3$ is $CH_3(CH_2)_n$, n being between to 0 and 5; $HOOC(CH_2)_nCOOH$, n=0-8; aromatic difunctional acids as phtalic acid; $HOOC(CH_2)_nPO(OH)_2$, n=2, 4; hydroxy aliphatic acids; $HOOC(CH_2OH)_nCOOH$, n=1-2; $CH_3CH(NH_2)COOH$. Preferably, the chelating agent is acetic acid.

The useful solvent of chelating agent of aluminum is generally water but another solvent niscible to water can be used in order to solubilize the chelating agent before its adding to the hybrid aluminosilicate polymer resulting from step c).

Step e) can comprise a first adding of acetic acid and a following adding of another different chelating agent of aluminum. This method is particularly useful to help the chelation when the chelating agent comprises large bulky groups.

The amount of chelating agent of aluminum corresponds to a molar ratio between chelating functions of the chelating agent and aluminum of the hybrid aluminosilicate polymer, which can be greater than 0.1. Preferably, the molar ratio is comprised between 0.1 and 10, and preferably between 0,1 and 4.

The introduction of a chelating agent of aluminium allows to modify the surface of the hybrid aluminosilicate polymer by forming a chelate compound. The functional group of the chelating agent allows to increase the affinity of the hybrid aluminosilicate polymer with the medium in which it is used.

The Raman spectrum of the hybrid aluminosilicate polymer material resulting from step e) comprises the same bands as the hybrid aluminosilicate polymer material resulting from step b), as well as bands corresponding to the chelating agent in its chelate form.

The hybrid aluminosilicate polymer material according to the present invention resulting from step e) has physical gel form. The Al/Si molar ratio is between 1 and 3.6.

The following examples illustrate the present invention without however limiting the scope.

EXAMPLE 1

Comparision

Imogolite, fibrous aluminosilicate polymer, according to the method described in Patent Application EP-A-1,112,959 was prepared.

Figure 1:
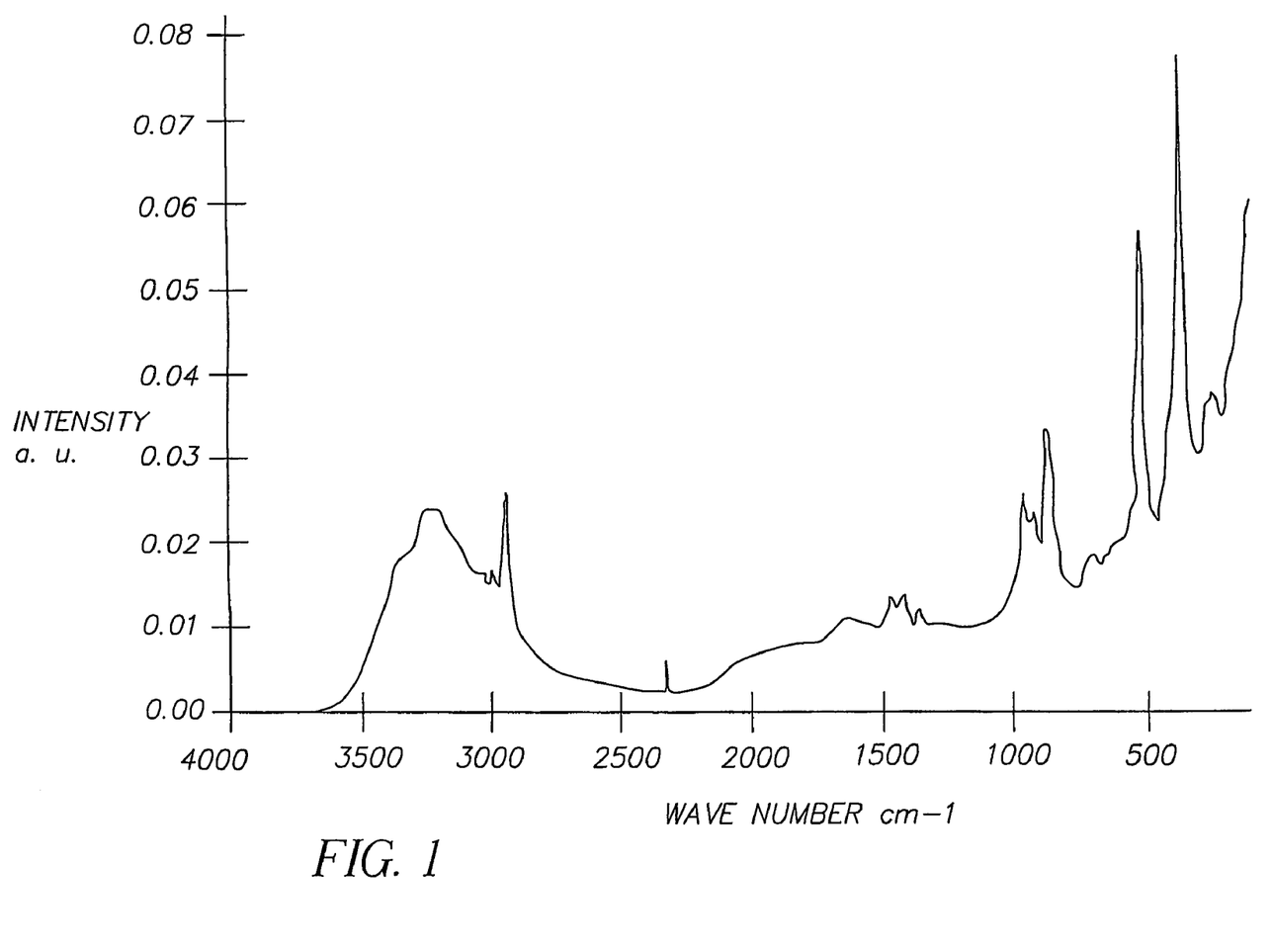
FIG. 1 represents a spectrum obtained by Raman spectroscopy of an inorganic aluminosilicate polymer corresponding to imogolite.

364.5 g $AlCl_3$, $6H_2O$ (1.51 mole), then 127.7 g tetramethyl orthosilicate (0.84 mole) were added to 100 l of osmosed water. A transparent solution was obtained that was stirred for 30 minutes. The reaction mixture was circulated through a bed of glass beads 2 mm in diameter (Prolabo) using a pump with output 10 l/min. 3.46 l of NaOH 1M were added in at least two hours. The reaction medium became cloudy. It was stirred for three hours. The medium became clear. The pump was then disconnected. Then 1.063 l NaOH 1M were added. A white precipitate formed. This was left to settle overnight, and then the supernatant liquid was eliminated. About 30 liters of product remained. 0.6 l of a 50/50 by volume mixture of HCl, 1M and acetic acid, 2M was added to the precipitate. It was stirred for six hours. The mixture became clear and had a pH of 4.0. Then 146 liters of osmosed water were added. The final volume was 176 liters. The solution was ready for the maturation phase: this solution was left in an inert plastic container (polypropylene) for ten days at ambient temperature (about 20° C.). Then, the mixture was heated to 96° C. while stirring for 24 hours in a stainless steel reactor. Then the reaction medium was concentrated by ultrafiltration using an Amicon 100 K membrane. An imogolite type inorganic fibrous aluminosilicate polymer was obtained, shown by electron diffraction. The Raman spectrum of this polymer is represented by FIG. 1.

In all the examples described, a Raman Bruker RFS 100 spectrometer (laser exciting wavelength, 1064 nm, power 800 mW, and 512 scans) was used to obtain the Raman spectra. The spectra were acquired in reflection mode (180°) using a lens with semi-cylindrical mirror. Samples were analyzed in solid form (obtained by lyophilization) without special preparation. Raman spectra instead of infrared spectra were preferred, because the materials according to the invention were water rich and the infrared spectrum of the material was then masked by the water. This problem did not appear with the Raman spectra technology. Materials that have the same Raman signature belong to the same family.

EXAMPLE 2

Invention

Figure 2:
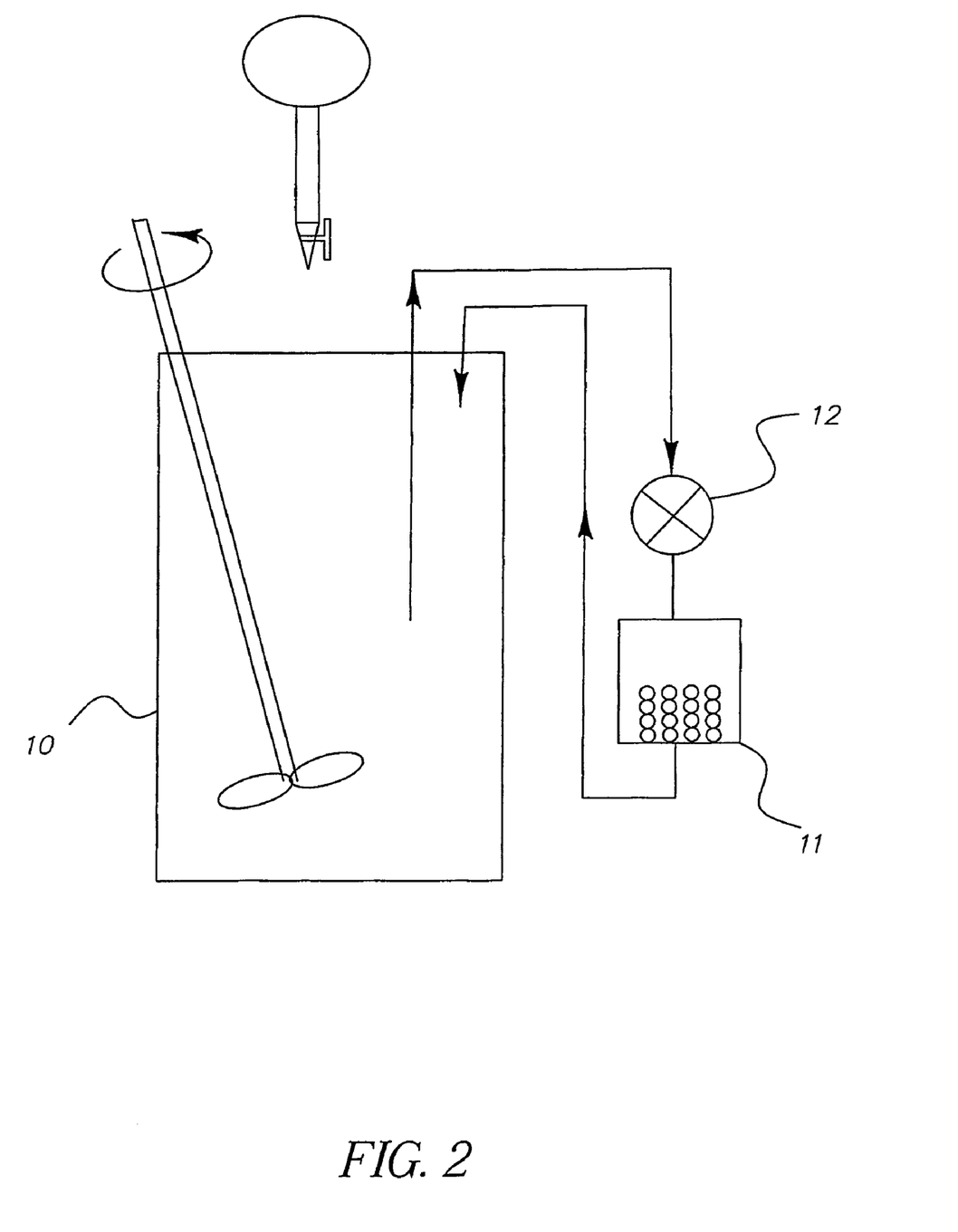
FIG. 2 represents diagrammatically a device for carrying out steps a) and b) of the method according to the invention.

With reference to FIG. 2, 100 l of osmosed water were poured into a plastic polypropylene) reactor (10). 4.53 moles $AlCl_3$, $6H_2O$ were added. Separately, a mixture of tetraethyl orthosilicate and methyltriethoxysilane was prepared in a quantity corresponding to 2.52 moles silicon and so as to have a tetraethyl orthosilicate/methyltriethoxysilane ratio of 1 in moles silicon. This mixture was added to the aluminum chloride solution. The resulting mixture was stirred and circulated simultaneously through a bed formed of 1-kg glass beads (11) 2-mm diameter using a pump (12) with 8-l/min output. The operation of preparing the modified mixed aluminum and silicon precursor took 120 minutes. Then, according to step a) of the method according to the invention, 10.5 moles NaOH 3M were added to the contents of the reactor (10) in four hours. Aluminum concentration was $4.3 \times 10^{-2}$ mol/l, Al/Si molar ratio 1.8 and alkali/Al ratio 2.31. The reaction medium clouded. According to step b) of the method according to the invention, the mixture was stirred for 48 hours. The medium became clear. The circulation was stopped in the glass bead bed. The hybrid aluminosilicate polymer material according to the present invention was thus obtained in dispersion form. Step c) of the method according to the invention consisted in performing preconcentration by a factor of 3 by nanofiltration, then diafiltration using a Filmtec NF 2540 nanofilitration membrane (surface area 6 m$^2$) to eliminate the sodium salts to obtain an Al/Na rate greater than 100. The retentate resulting from the diafiltration by nanofiltration was concentrated to obtain a gel with about 20% by weight of organic-inorganic hybrid aluminosilicate polymer according to the invention.

EXAMPLE 3

Figure 3:
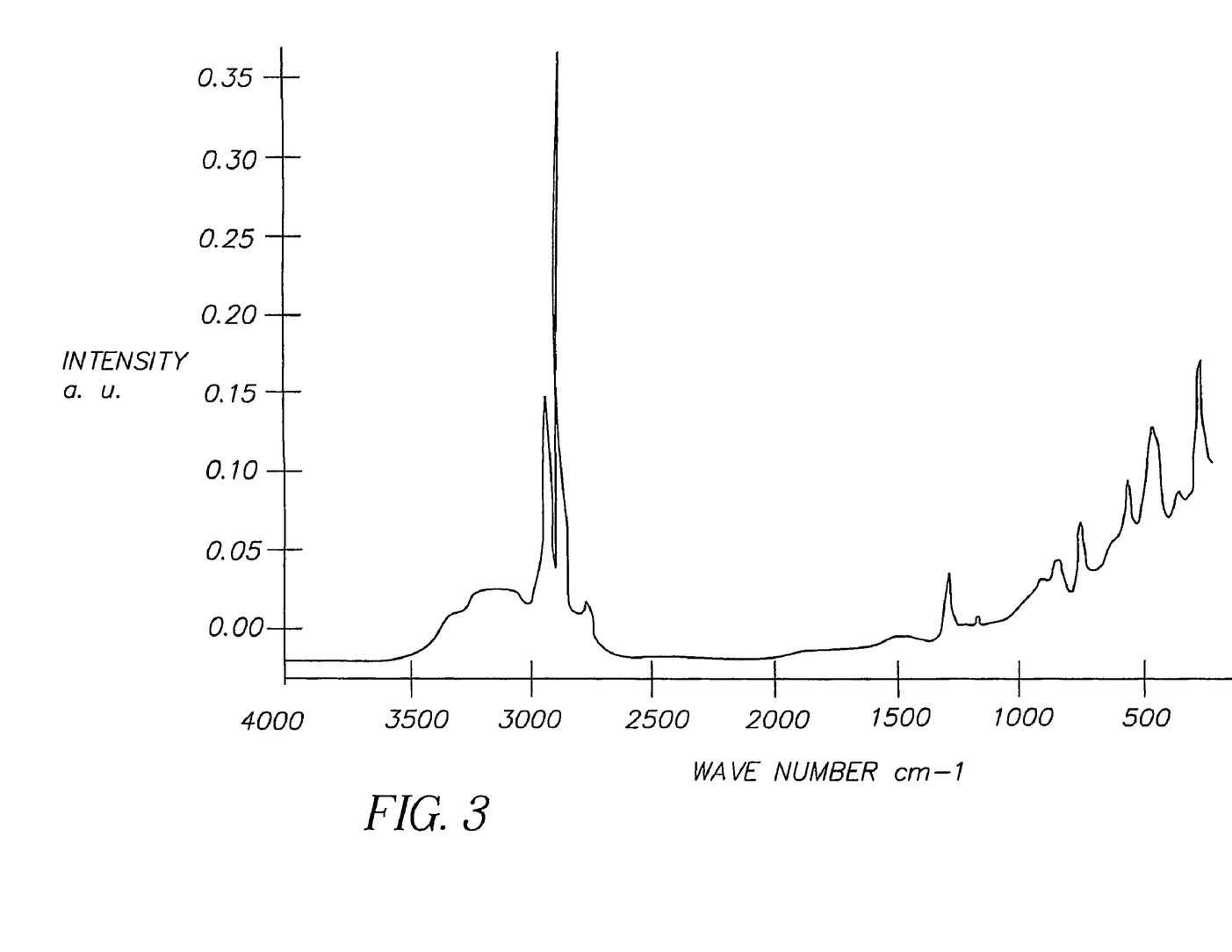
FIGS. 3 to 11 represent the spectra obtained by Raman spectroscopy of hybrid aluminosilicate polymers according to the present invention.

Invention 15 moles $AlCl_3$, $6H_2O$, then 3.5 kg glass beads 2-mm diameter, were added to 75 l osmosed water. Separately, a mixture of tetraethyl orthosilicate and methyltriethoxysilane was prepared in a quantity corresponding to 8.34 moles silicon and so as to have a ratio of tetraethyl orthosilicate to methyltriethoxysilane of 1 in moles silicon. This mixture was added to the aluminum chloride solution. The resulting mixture was stirred vigorously. The operation of preparing the modified mixed aluminum and silicon precursor took 20 minutes to obtain a clear homogeneous medium. Then, according to step a) of the method according to the invention, 45 moles NaOH dissolved in 75 liters of osmosed water were added to the reaction medium, in 30 minutes. The reaction medium clouded. Aluminum concentration was 0.1 mol/l, Al/Si molar ratio 1.8 and alkali/Al ratio 3. According to step b) of the method according to the invention, the mixture was stirred for 15 minutes. The hybrid aluminosilicate polymer material according to the present invention was thus obtained in suspension form. FIG. 3 represents the Raman spectrum of this polymer that was lyophilized to obtain its Raman signature. Step c) of the method according to the invention consisted in adding 676 g HCl 37% first diluted to 5 liters, and stirring for 150 minutes to obtain a dispersion of the aluminosilicate polymer according to the invention. The dispersion was then diafiltrated using a Filmtec NF 2540 nanofiltration membrane (surface area 6 mm$^2$) to eliminate the sodium salts to achieve an Al/Na ratio greater than 100. The retentate resulting from the diafiltration by nanofiltration was concentrated to obtain a gel with about 20% by weight of organic-inorganic hybrid aluminosilicate polymer according to the invention.

EXAMPLE 4

Figure 4:
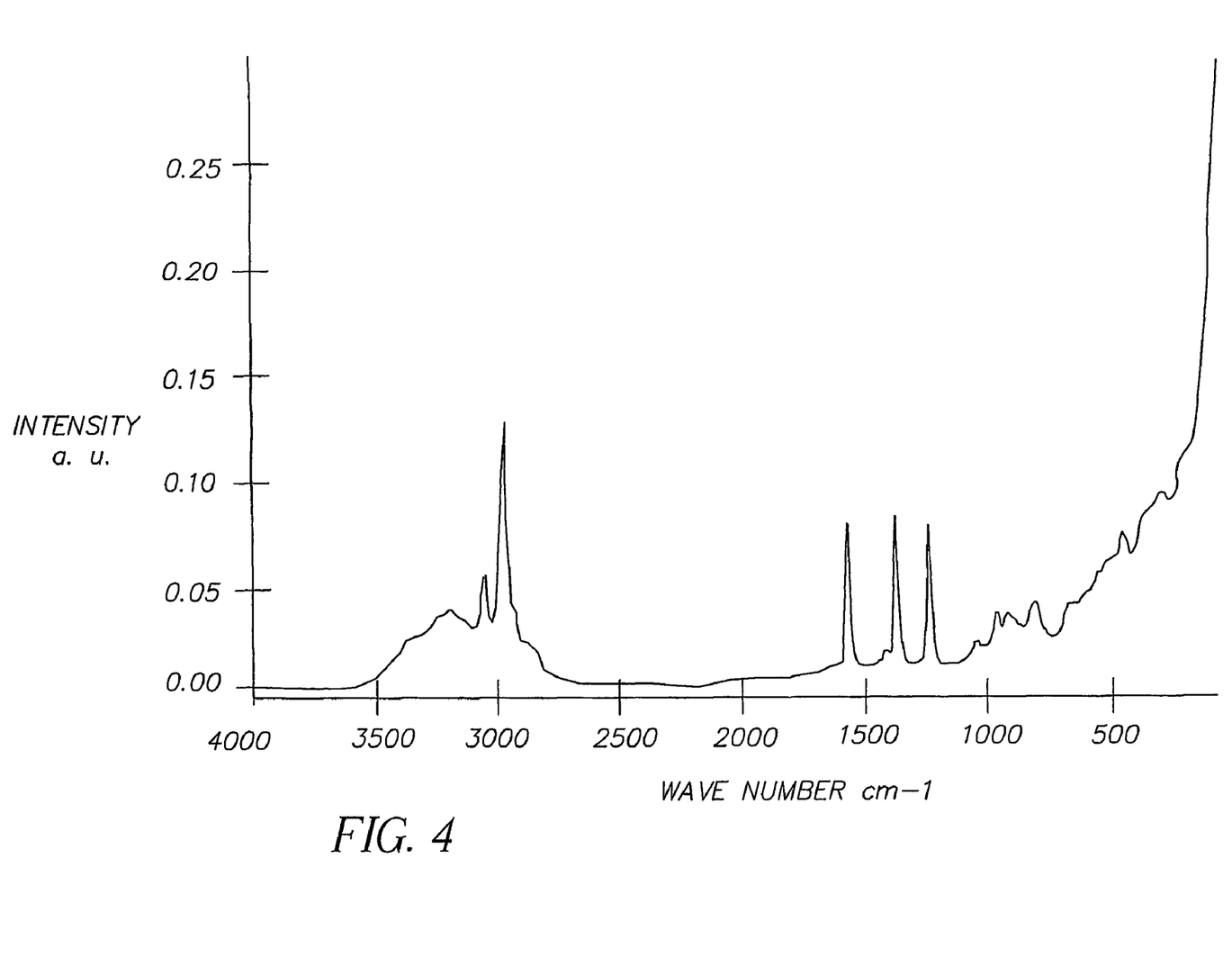

Invention 1.51 moles $AlCl_3$, $6H_2O$ were added to 100 l osmosed water. Separately, a mixture of tetraethyl orthosilicate and vinyltriethoxysilane was prepared in a quantity corresponding to 0.84 moles silicon and so as to have a ratio of tetraethyl orthosilicate to methyltriethoxysilane of 1 in moles silicon. This mixture was added to the aluminum chloride solution. The resulting mixture was stirred and circulated simultaneously through a bed formed of 1-kg glass beads 2-mm diameter using a pump with 8-l/min output. The operation of preparing the modified mixed aluminum and silicon precursor took 120 minutes. Then, according to step a) of the method according to the invention, 3.5 moles NaOH 1M were added in two hours. The reaction medium clouded. According to step b) of the method according to the invention, the mixture was stirred for 15-20 hours. The medium became clear. The circulation was stopped in the glass bead bed. Then, according to step d) of the method according to the invention, 1.03 moles NaOH 1M were added in ten minutes. Aluminum concentration was $1.4 \times 10^{-2}$ mol/l, Al/Si molar ratio 1.8 and alkali/Al ratio 3. The hybrid aluminosilicate polymer material according to the present invention was thus obtained in suspension form. FIG. 4 represents the Raman spectrum of this polymer that was lyophilized to obtain its Raman signature. Step c) of the method according to the invention consisted in leaving the polymer suspension to settle for 24 hours, then in discarding the supernatant to recover the sediment. This sediment was washed with osmosed water by successive sedimentations to obtain a sodium level in the supernatant less than 10 ppm. Then the sediment was centrifuged to obtain a gel with about 4% by weight of aluminosilicate polymer according to the invention. The resulting gel was lyophilized (20 mT, −50° C.) to obtain a solid of constant mass. The hybrid aluminosilicate polymer material according to the present invention was thus obtained in powder form The powder can be redispersed by adding water and acid, such as hydrochloric or acetic acid, and with mechanical stirring.

EXAMPLE 5

Invention

Figure 5:
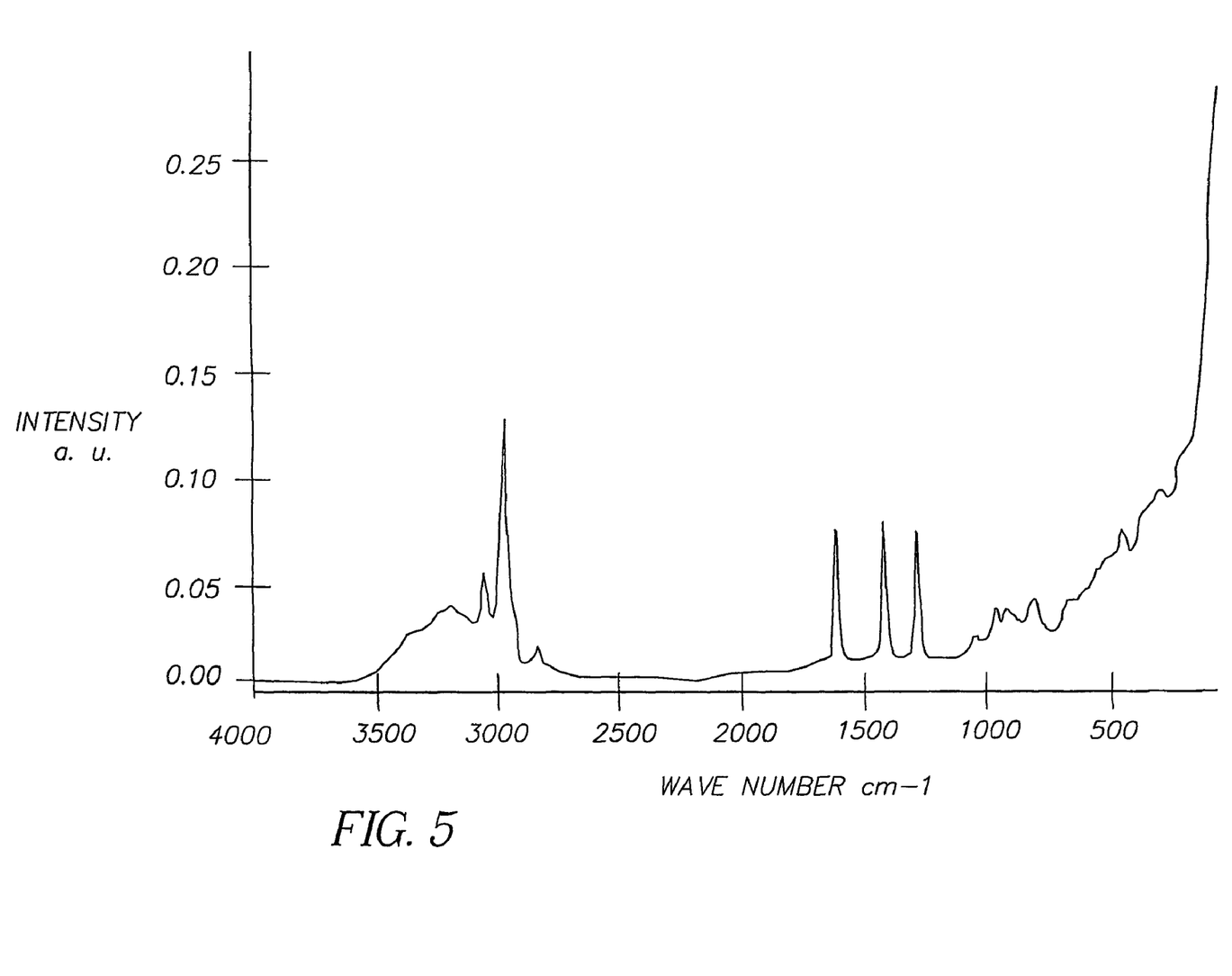

Example 4 was repeated replacing tetraethyl orthosilicate and vinyltriethoxysilane by tetramethyl orthosilicate and vinyltrimethoxysilane respectively. The same Raman spectrum was obtained as that of Example 4. (See FIG. 5)

EXAMPLE 6

Figure 6:
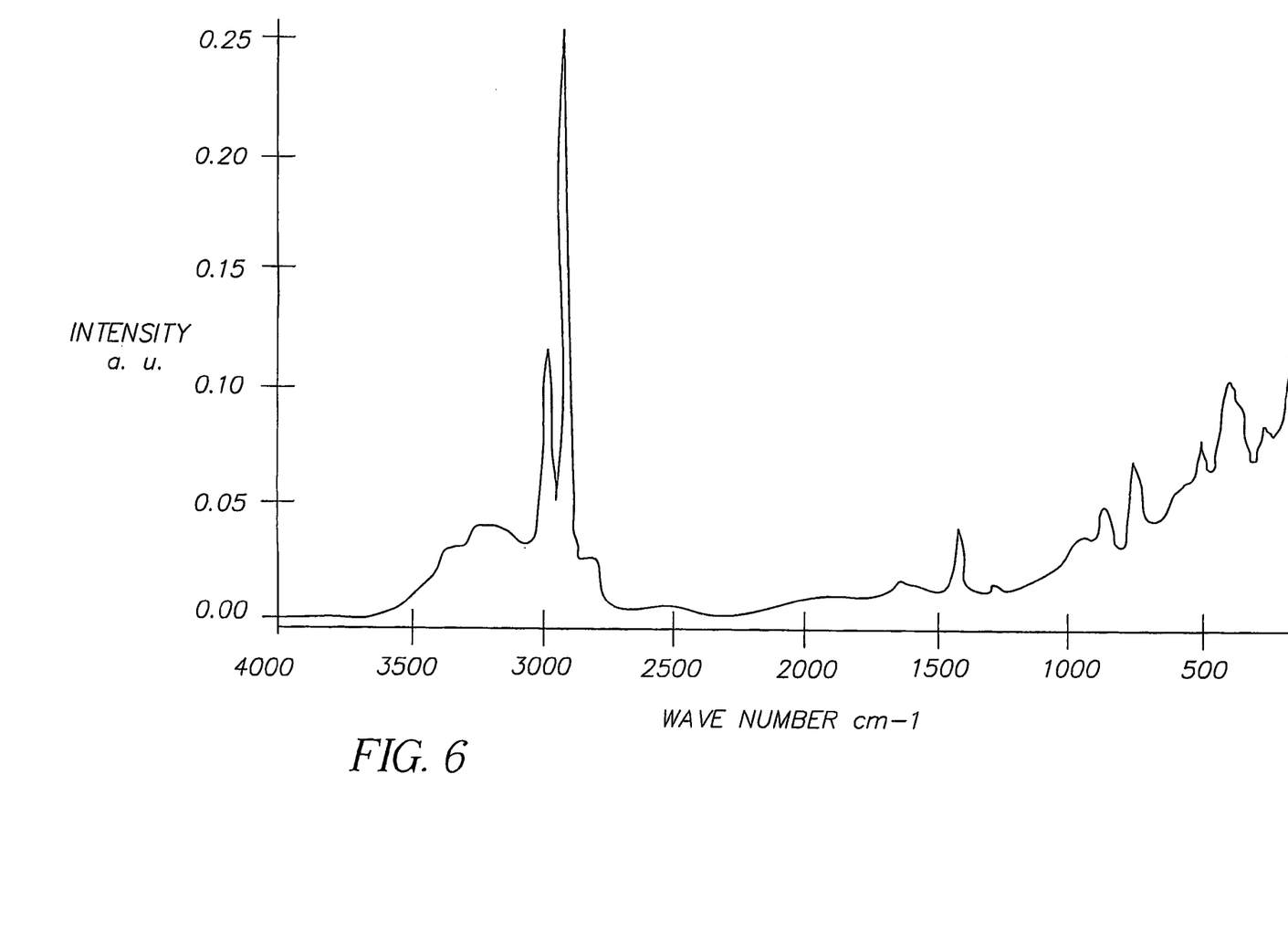

Invention 4.53 moles $AlCl_3$, $6H_2O$ were added to 100 l osmosed water. Separately, a mixture of tetraethyl orthosilicate and methyltriethoxysilane was prepared in a quantity corresponding to 2.52 moles silicon and so as to have a ratio of tetraethyl orthosilicate to methyltriethoxysilane of 1 in moles silicon. This mixture was added to the aluminum chloride solution. The resulting mixture was stirred and circulated simultaneously through a bed formed of 1-kg glass beads (11) 2-mm diameter using a pump (12) with 8-l/min output. The operation of preparing the modified mixed aluminum and silicon precursor took 120 minutes. Then, according to step a) of the method according to the invention, 10.5 moles NaOH 3M were added in four hours. The reaction medium clouded. According to step b) of the method according to the invention, the mixture was stirred for 24 hours. The medium became clear. The circulation was stopped in the glass bead bed. Then, according to step d) of the method according to the invention, 3.09 moles NaOH 3M were added in ten minutes. Aluminum concentration was $4.3 \times 10^{-2}$ mol/l, Al/Si molar ratio 1.8 and alkali/Al ratio 3. The hybrid aluminosilicate polymer material according to the present invention was thus obtained in suspension form. FIG. 6 represents the Raman spectrum of this polymer that was lyophilized to obtain its Raman signature.

Step c) of the method according to the invention consisted in leaving the resulting polymer suspension to settle for 24 hours, then in discarding the supernatant to recover the sediment. Then 2 liters of an $HCl/CH_3COOH$ M/2M mixture were added to this sediment to obtain a dispersion of the aluminosilicate polymer according to the invention. The dispersion was then diafiltrated using a Filmtec NF 2540 nanofiltration membrane (surface area 6 m$^2$) to eliminate the sodium salts to achieve an Al/Na ratio greater than 100. Then the retentate resulting from the diafiltration by nanofiltration was concentrated to obtain a gel with about 20% by weight of aluminosilicate polymer according to the invention. The resulting gel was lyophilized (20 mT, −50° C.) to obtain a solid of constant mass. The organic-inorganic hybrid aluminosilicate polymer material according to the invention was thus obtained in powder form. The powder can be redispersed by adding water and acid, such as hydrochloric or acetic acid, and with mechanical stirring.

EXAMPLE 7

Figure 7:
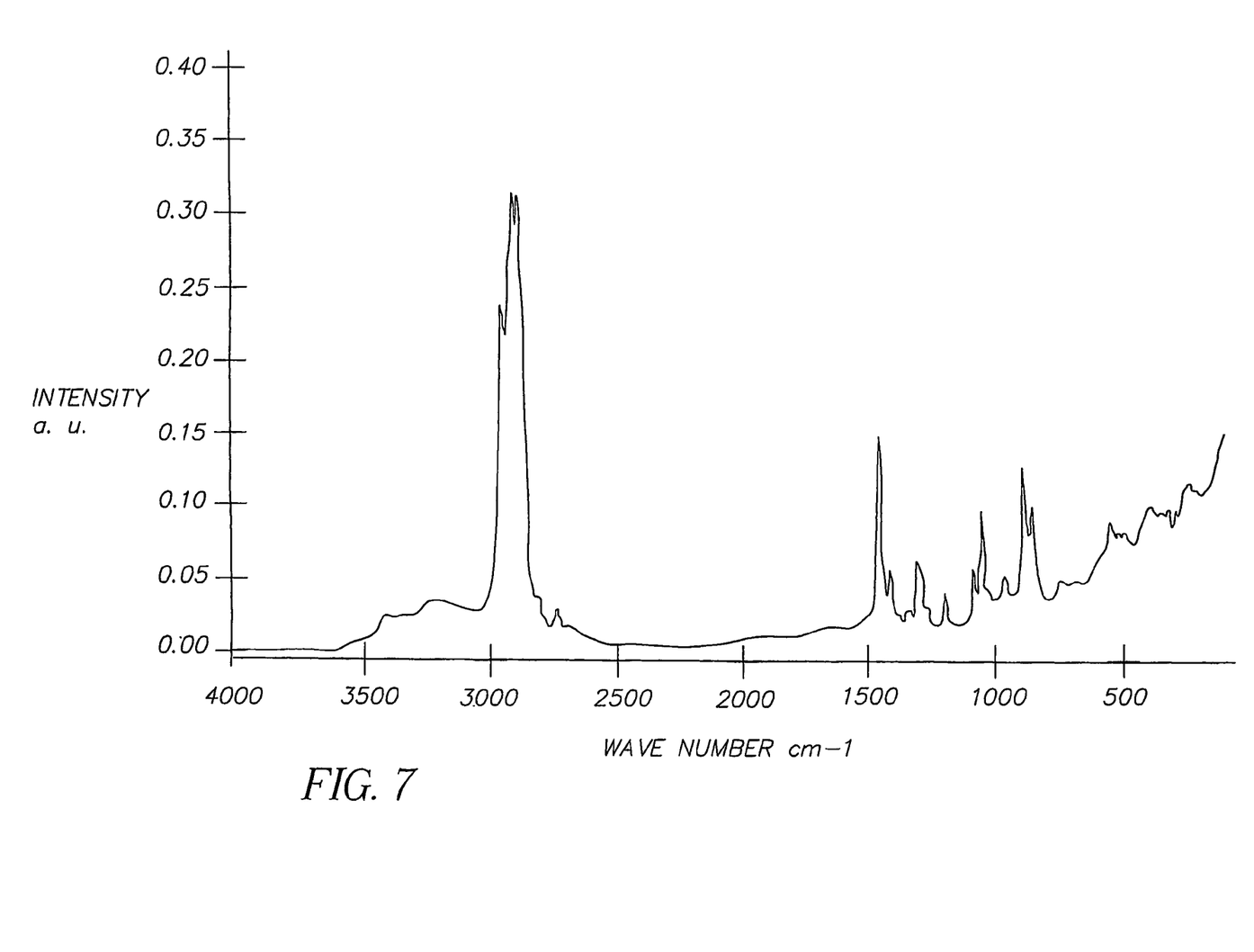

Invention 0.45 moles $AlCl_3$, $6H_2O$ were added to 10 l osmosed water. Separately, a mixture of ethanol (44.6 g), tetraethyl orthosilicate and n-butyltrimethoxysilane was prepared in a quantity corresponding to 0.25 moles silicon and so as to have a ratio of tetraethyl orthosilicate to n-butyltrimethoxysilane of 1 in moles silicon. This mixture was added to the aluminum chloride solution. The resulting mixture was stirred and circulated simultaneously through a bed formed of 100-g glass beads 2-mm diameter using a pump with 8-l/min output The operation of preparing the modified mixed aluminum and silicon precursor took 60 minutes. Then, according to step a) of the method according to the invention, 1.05 moles NaOH 3M were added to the precursor in two hours. The reaction medium clouded. According to step b) of the method according to the invention, the mixture was stirred for 24 hours. The medium became clear. The circulation was stopped in the glass bead bed. Then, according to step d) of the method according to the invention, 0.3 moles NaOH 3M were added in five minutes. Aluminum concentration was $4.3 \times 10^{-2}$ mol/l, Al/Si molar ratio 1.8 and alkali/Al ratio 3. The hybrid aluminosilicate polymer material according to the present invention was thus obtained in suspension form. FIG. 7 represents the Raman spectrum of this polymer that was lyophilized to obtain its Raman signature. Step c) of the method according to the invention consisted in leaving the polymer suspension to settle for 24 hours, then in discarding the supernatant to recover the sediment. This sediment was washed with osmosed water by successive sedimentations to obtain a sodium level in the supernatant less than 10 ppm. Then the sediment was centrifuged to obtain a gel with about 4% by weight of aluminosilicate polymer according to the invention. The resulting gel was lyophilized (20 mT, −50° C.) to obtain a solid of constant mass. The organic-inorganic hybrid aluminosilicate polymer material according to the invention was thus obtained in powder form. The powder can be redispersed by adding water and acid, such as hydrochloric or acetic acid, and with mechanical stirring.

EXAMPLE 8

Invention

Figure 8:
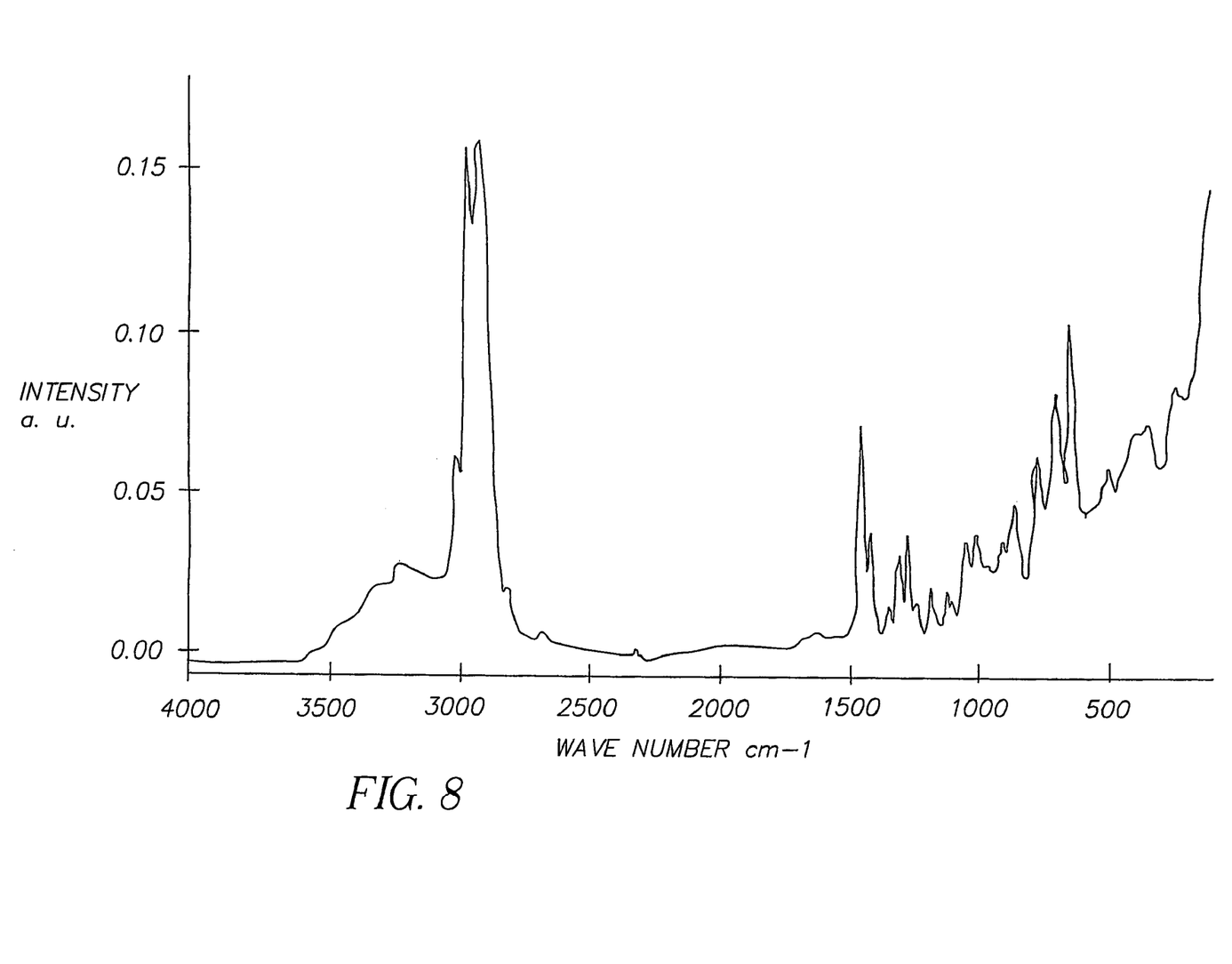

Example 7 was repeated using, for preparing the modified mixed aluminum and silicon precursor, a mixture of ethanol (3168 g), tetraethyl orthosilicate and 3-chloropropyltriethoxysilane in a quantity corresponding to 0.25 moles silicon and so as to have a ratio of tetraethyl orthosilicate/3-chloropropyltriethoxysilane of 1 in moles silicon. FIG. 8 represents the Raman spectrum of this polymer that was lyophilized to obtain its Raman signature.

EXAMPLE 9

Invention 31.3 moles $AlCl_3$, $6H_2O$ were added to 100 l osmosed water. Separately, a mixture of tetraethyl orthosilicate and methyltriethoxysilane was prepared in a quantity corresponding to 16,79 moles silicon and so as to have a ratio of tetraethyl orthosilicate to methyltriethoxysilane of 1 in moles silicon. This mixture was added to the aluminum chloride solution. The resulting mixture was stirred and circulated simultaneously through abed formed of 1-kg glass beads 2-mm diameter using a pump with 8-l/min output. The operation of preparing the modified mixed aluminum and silicon precursor took 120 minutes. Then, according to step a) of the method according to the invention, 70 moles NaOH 20M were added to the precursor in two hours. The reaction medium clouded. According to step b) of the method according to the invention, the mixture was stirred for 15-20 hours. The medium became clear. The circulation was stopped in the glass bead bed. Then, according to step d) of the method according to the invention, 21.5 moles NaOH 20M were added in ten minutes. Aluminum concentration was 0.3 mol/l, Al/Si molar ratio 1.9 and alkali/Al ratio 2.9. The aluminosilicate polymer material according to the present invention is thus obtained in suspension form. Step c) of the method according to the invention consisted in leaving the polymer suspension to settle for 24 hours, then in discarding the supernatant to recover the sediment This sediment was washed with osmosed water by successive sedimentations to obtain a sodium level in the supernatant less than 10 ppm. Then the sediment was centrifuged to obtain a gel with about 4% by weight of aluminosilicate polymer according to the invention. The resulting gel was lyophilized (20 mT, −50° C.) to obtain a solid of constant mass. The aluiminosilicate polymer material according to the present invention was thus obtained in powder form. The powder can be redispersed by adding water and acid, such as hydrochloric or acetic acid, and with mechanical stirring.

EXAMPLE 10

Invention

Figure 9:
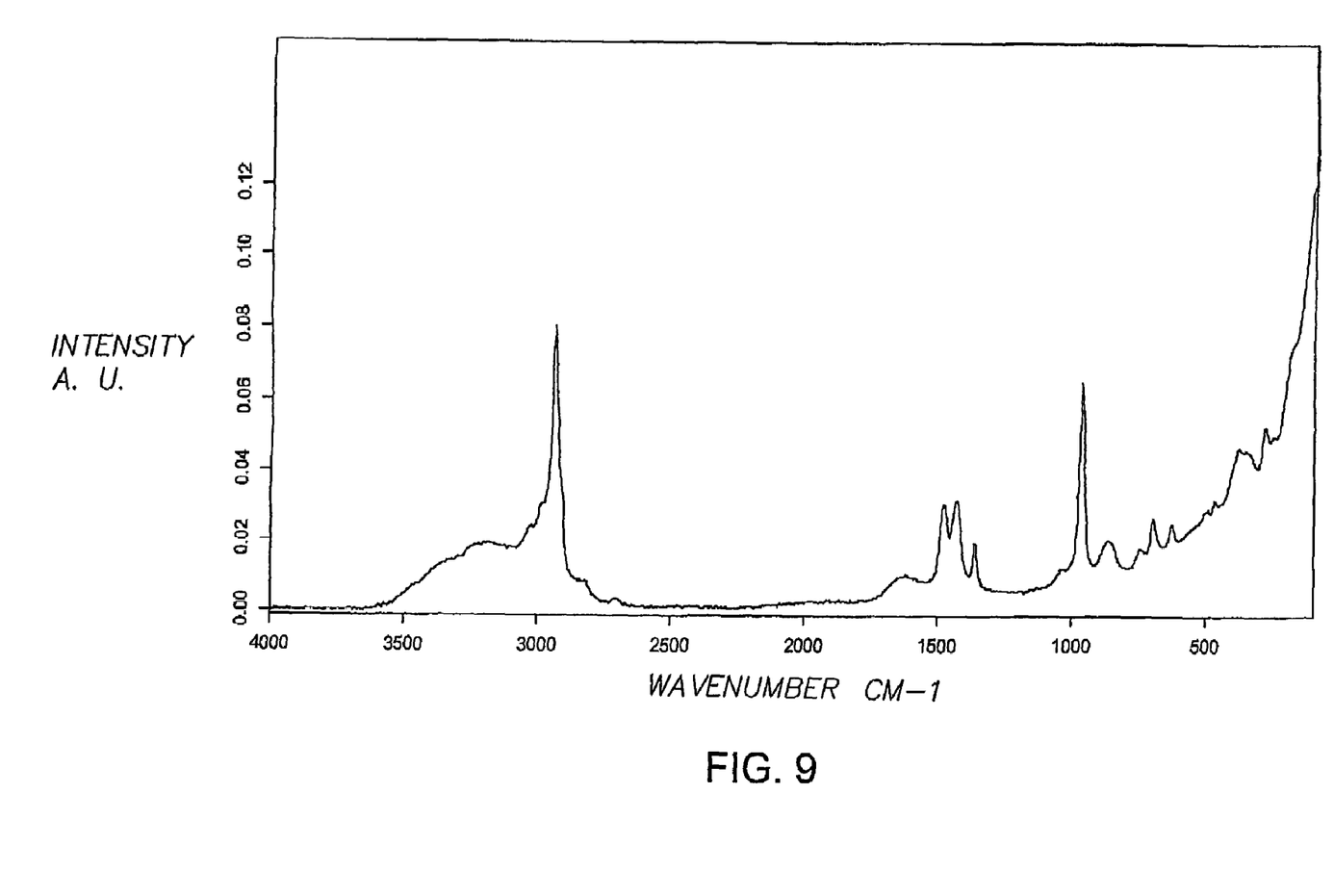

Glacial acetic acid (340 mg, 5.6 mmol) was added to 20 g of a gel of methyl hybride aluminosilicate polymer (Al amount=75 mg, 2.8 mmol, (measured by inductively coupled plasma atomic emission spectroscopy, ICP) as obtained in Example 2. The mixture was stirred during 2 days. The excess of water and the unreacted acetic acid were removed by evacuation under vacuum at 35° C. 4.4 g of a white powder was obtained. The Raman spectrum of this hybrid aluminosilicate polymer material according to the invention is represented by FIG. 9. The Raman spectrum comprises the bands of the hybrid aluminosilicate polymer obtained in Example 2, as well as the bands corresponding to the chelating agent in its acetate form.

EXAMPLE 11

Invention

Figure 10:
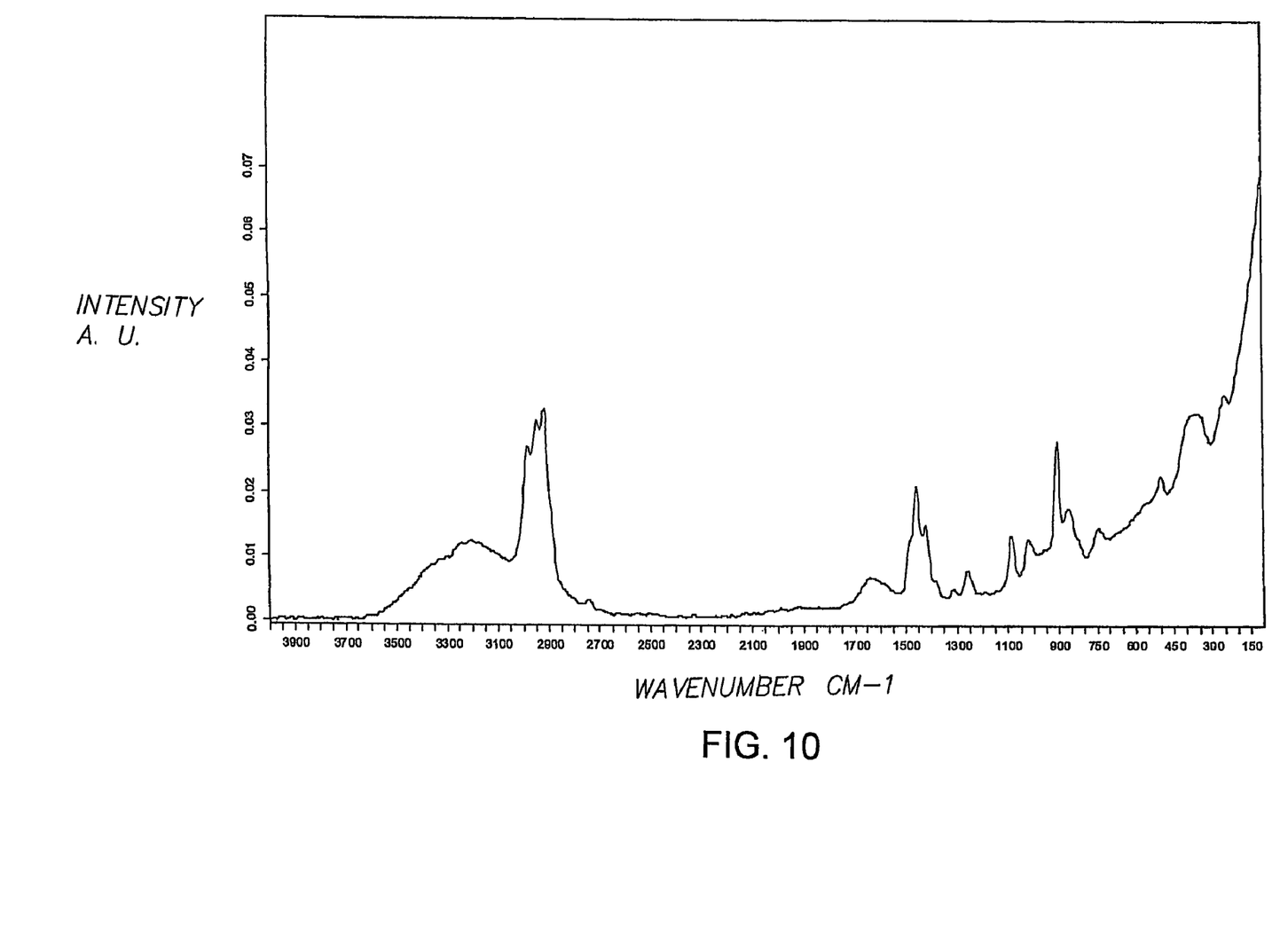

Propionic acid (400 mg, 5.56 mmol) was added to 20 g of a gel of methyl hybride aluminosilicate polymer (Al amount=75 mg, 2.8 mmol) as obtained in Example 2. The mixture was stirred during 1 day. The excess of water and the unreacted propionic acid were removed by evacuation under vacuum at 35° C. A white powder was obtained. The Raman spectrum of this hybrid aluminosilicate polymer material according to the invention is represented by FIG. 10. The Raman spectrum comprises the bands of the hybrid aluminosilicate polymer obtained in Example 2, as well as the bands corresponding to the chelating agent in its propionate form.

EXAMPLE 12

Figure 11:
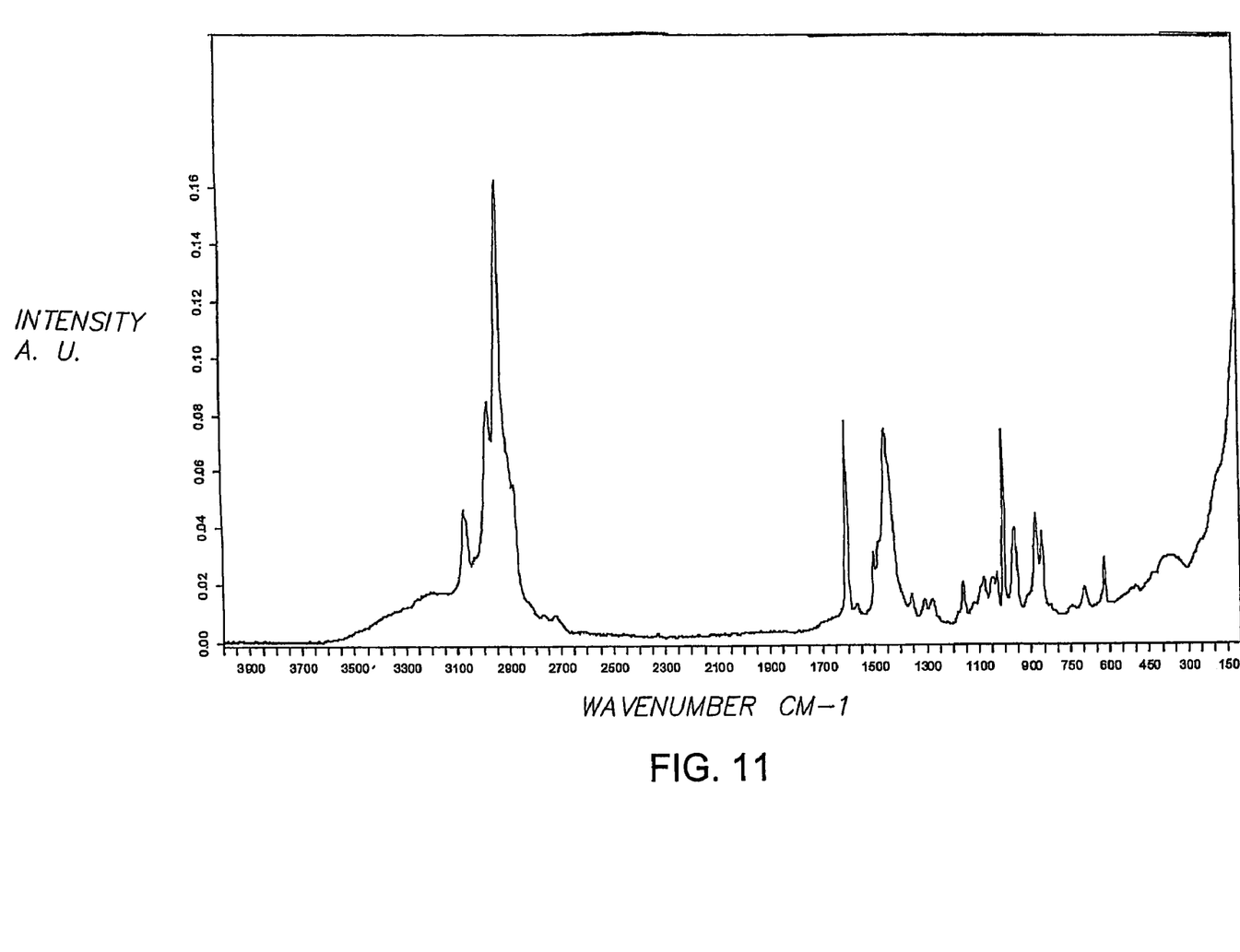

Invention 1 g of the hybrid aluminosilicate polymer modified with acetic acid obtained in Example 10 (Al amount=16.2 mg, 0.6 mmole) was dispersed in 10 g of water. Benzoic acid (38 mg, 0.3 mmole) was then solubilized in 1 g of ethanol and added to the hybrid aluminosilicate polymer suspension. The mixture was stirred during 2 days. The excess of water was removed under vacuum at 35° C. A white powder was obtained. The Raman spectrum of this hybrid aluminosilicate polymer material according to the invention is represented by FIG. 11. The Raman spectrum comprises the bands of the hybrid aluminosilicate polymer obtained in Example 2, as well as the bands corresponding to the chelating agent in its benzoate form and residual acetate form.

The invention claimed is:

1. A method for preparing a hybrid aluminosilicate polymer, comprising the following steps:
   a) treating a mixed aluminum and silicon alkoxide of which the silicon has hydrolyzable substituents and one non-hydrolyzable substituent, or a mixed aluminum and silicon precursor resulting from the hydrolysis of a mixture of aluminum compounds and silicon compounds only having hydrolyzable substituents and silicon compounds having one non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3
   b) stirring the mixture resulting from step a) at ambient temperature of between 15° C. and 35° C. in the presence of silanol groups long enough to form the hybrid aluminosilicate polymer; and then directly
   c) eliminating the byproducts formed during steps a) and b) from the reaction medium.

2. The method according to claim 1, wherein the alkali of step a) is selected from the group consisting of sodium, potassium, and lithium hydroxide, diethylamine and triethylamine.

3. The method according to claim 1, wherein the silanol groups are supplied in silica or glass bead form.

4. The method according to claim 3, wherein the silica or glass beads have a diameter between 0.2 and 5 mm.

5. The method according to claim 1, wherein the aluminum concentration is maintained between $1.4 \times 10^{-2}$ and 0.3 mol/l.

6. The method according to claim 1, wherein the aluminum concentration is maintained between $4.3 \times 10^{-2}$ and 0.3 mol/l.

7. The method according to claim 1, wherein said alkali/Al molar ratio is about 2.3.

8. The method according to claim 1, wherein said alkali/Al molar ratio is about 3.

9. The method according to claim 1, wherein the mixed aluminum and silicon precursor resulting from hydrolysis of a mixture of aluminum compounds and silicon compounds only having hydrolyzable substituents and silicon compounds having one non-hydrolyzable substituent is a product resulting from the mixture in an aqueous medium (i) of a compound selected from the group consisting of aluminum salts, aluminum alkoxides and aluminum halogenoalkoxides and (ii) at least one compound selected from the group consisting of silicon alkoxides and chloroalkoxides only having hydrolyzable substituents, and (iii) at least one compound selected from the group consisting of silicon alkoxides and chloroalkoxides having one non-hydrolyzable substituent.

10. The method according to claim 9, wherein said mixed aluminum and silicon precursor is the product resulting from the mixture (i) of an aluminum halide and (ii) a mixture having at least one silicon alkoxide only having hydrolyzable substituents and at least one silicon alkoxide having one non-hydrolyzable substituent.

11. The method according to claim 10, wherein the ratio of silicon alkoxide only having hydrolyzable substituents to silicon alkoxide having one non-hydrolyzable substituent is between 0.1 and 10 in moles silicon.

12. The method according to claim 11, wherein the ratio of silicon alkoxide only having hydrolyzable substituents to silicon alkoxide having one non-hydrolyzable substituent is 1 in moles silicon.

13. The method according to claim 9, wherein the silicon alkoxide having one non-hydrolyzable substituent is represented by the formula where R represents an alkyl group comprising 1 to 5 carbon atoms R' represents H, F, or a substituted or unsubstituted non-liner or ramified alkyl or alkenyl group comprising 1 to 8 carbon atoms.

14. The method according to claim 13, wherein R' represents a methyl, ethyl, n-propyl, n-butyl, 3-chloropropyl, vinyl group.

15. The method according to claim 14, wherein said silicon alkoxide having one non-hydrolyzable substituent is methyltriethoxysilane or vinyltriethoxysilane.

16. The method according to claim 10, wherein said silicon alkoxide only having hydrolyzable substituents is tetramethyl orthosilicate or tetraethyl orthosilicate.

17. The method according to claim 1, comprising, after step c) a step d), by which at least one acidic modifying agent of aluminum is added to the hybrid aluminosilicate polymer resulting from step b) to modify the surface thereof.

18. The method according to claim 17, wherein said acidic modifying agent of aluminum is selected from the group consisting of carboxylic acids, phosphonic acids, sulfonic acids, difunctional acids, their ester and anhydride components and amino acids.

19. The method according to claim 18, wherein said acidic modifying agent of aluminum is selected from the group consisting of HCOOH, $R_1$COOH wherein $R_1$ is selected from the group consisting of $CH_3(CH_2)_n$, n being between to 0 and 12, $CF_3$, $C_6H_5$, $(C_6H_5)_2$, substituted aromatic rings, $C_4H_4S$; $R_2PO(OH)_2$ wherein $R_2$ is selected from the group consisting of $CH_3$, $C_6H_5$, $R_3SO_3H$ wherein $R_3$ is $CH_3(CH_2)_n$, n being between to 0 and 5; $HOOC(CH_2)_nCOOH$, n=0-8; aromatic difunctional acids; $HOOC(CH_2)_nPO(OH)_2$, n=2,4; hydroxy aliphatic acids; $HOOC(CH_2OH)_nCOOH$, n=1-2; $CH_3CH(NH_2)COOH$.

20. The method according to claim 17, wherein step d) comprises a first adding of acetic acid and a following adding of another different acidic modifying agent of aluminum.

21. The method according to claim 17, wherein the amount of acidic modifying agent of aluminum corresponds to a molar ratio between chelating functions of the chelating agent and aluminum of the hybrid aluminosilicate polymer comprised between 0.1 and 10.

22. The material obtainable by the method according to claim 1, characterized in that its Raman spectrum comprises in spectral region 200-600 $cm^{-1}$ a wide band at 250±6 $cm^{-1}$, a wide intense band at 359±6 $cm^{-1}$, a shoulder at 407±7 $cm^{-1}$, and a wide band at 501±6 $cm^{-1}$, as well as bands corresponding to the silicon non-hydrolyzable substituent, wherein the bands linked to the non-hydrolyzable substituent can be juxtaposed with other bands, the Raman spectrum being produced for the material resulting from step b) and c) and before step d).

23. The method according to claim 1 wherein the hybrid aluminusilicate polymer is characterized in that its Raman spectrum comprises in spectral region 200-600 $cm^{-1}$ a wide band at 250±6 $cm^{-1}$, a wide intense band at 359±6 $cm^{-1}$, a shoulder at 407±7 $cm^{-1}$, and a wide band at 501±6 $cm^{-1}$, as well as bands corresponding to the silicon non-hydrolyzable substituent, wherein the bands linked to the non-hydrolyzable substituent can be juxtaposed with other bands, the Raman spectrum being produced for the material resulting from step b) and c) and before step d).

24. A method for preparing a hybrid aluminosilicate polymer, comprising the following steps:

a) treating a mixed aluminum and silicon alkoxide of which the silicon has hydrolyzable substituents and one non-hydrolyzable substituent, or a mixed aluminum and silicon precursor resulting from the hydrolysis of a mixture of aluminum compounds and silicon compounds only having hydrolyzable substituents and silicon compounds having one non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3 b) stirring the mixture resulting from step a) at ambient temperature of between 15° C. and 35° C. in the presence of silanol groups long enough to form the hybrid aluminosilicate polymer; and then directly c) adding alkali to increase the alkali/Al molar ratio to 3 if required if this ratio has not already been reached in step a); and then directly d) eliminating the byproducts formed during steps a) and b) and c) from the reaction medium.

* * * * *

UNITED STATES PATENT AND TRADEMARK OFFICE
CERTIFICATE OF CORRECTION

PATENT NO.        : 7,507,392 B2                                      Page 1 of 1
APPLICATION NO.   : 10/521899
DATED             : March 24, 2009
INVENTOR(S)       : Poncelet et al.

It is certified that error appears in the above-identified patent and that said Letters Patent is hereby corrected as shown below:

Title Page of Patent:
    Delete PCT Pub. No. "WO2004/016058" and insert -- WO2004/009494 --.
    Delete PCT Pub. Date "Feb. 19, 2004" and insert -- Jan. 29, 2004 --.

Column 12, claim 13, line 24, delete "non-liner" and insert -- non-linear --.

Column 13, claim 23, line 5, delete "aluminusilicate" and insert -- aluminosilicate --.

Signed and Sealed this

Fourteenth Day of July, 2009

JOHN DOLL
*Acting Director of the United States Patent and Trademark Office*